United States Patent

Squire et al.

Patent Number: 5,917,407
Date of Patent: Jun. 29, 1999

[54] UNATTENDED AUTOMATED BICYCLE RENTAL STATION

[76] Inventors: Joshua H. M. Squire, 831 N. May St., Coach Unit, Chicago, Ill. 60622; Yuval Degani, 853 W. Randolph St., Chicago, Ill. 60607; David Blakeman, 20332 White Fence Ct., Frankfort, Ill. 60423

[21] Appl. No.: 08/857,033

[22] Filed: May 15, 1997

[51] Int. Cl.⁶ .................................. B62J 3/00; G07F 7/00
[52] U.S. Cl. ...................... 340/432; 340/543; 340/568.1; 340/825.35; 194/205; 194/247; 194/902; 211/5; 235/381; 235/382; 70/233; 70/57
[58] Field of Search .................................. 340/432, 427, 340/543, 568, 825.31, 542, 825.33, 568.1, 572.9, 825.35; 194/254, 258, 283, 902, 247, 205; 70/233, 225, 226, 234, 14, 57; 211/5; 235/382, 381, 382.5

[56] References Cited

U.S. PATENT DOCUMENTS

| | | | |
|---|---|---|---|
| 3,762,569 | 10/1973 | Spring | 211/5 |
| 3,815,721 | 6/1974 | Montoya et al. | 70/227 |
| 3,865,245 | 2/1975 | Lieb et al. | 211/5 |
| 4,433,787 | 2/1984 | Cook et al. | 211/5 |
| 4,727,368 | 2/1988 | Larson et al. | 340/825.31 |
| 4,807,453 | 2/1989 | Bernier et al. | 70/235 |
| 4,830,167 | 5/1989 | Lassche | 194/247 |
| 4,891,503 | 1/1990 | Jewell | 705/44 |
| 4,920,334 | 4/1990 | Devolpi | 340/568 |
| 4,939,352 | 7/1990 | Sunyich | 235/382 |
| 5,278,538 | 1/1994 | Ainsworth et al. | 340/427 |

FOREIGN PATENT DOCUMENTS

| | | | |
|---|---|---|---|
| 2045707 | 11/1980 | United Kingdom | 211/5 |
| WO/9222718 | 12/1992 | WIPO . | |

OTHER PUBLICATIONS

Depo vervdersysteem, Dec. 1995.

*Primary Examiner*—Donnie L. Crosland
*Attorney, Agent, or Firm*—Vedder, Price, Kaufman & Kammholz

[57] ABSTRACT

An unattended, automated bicycle rental system utilizes a bicycle rental station having a locking bicycle rack and a control tower. The bicycle rack has an inventory of rental bicycles of non standard size as inventory and the bicycles are locked in place on the rack in distinct bicycle-receiving bays. The control tower incudes a credit card reader that unlocks a specific bicycle from its bay upon insertion of a bank or credit card and begins timing the period of time in which the bicycle is away from the rental station. When the bicycle is returned, it is placed into the bay and in contact with the rack so that an identification sensor can determine if it is a system bicycle and lock it in place in the rack and bill the credit card for the rental charge.

42 Claims, 8 Drawing Sheets

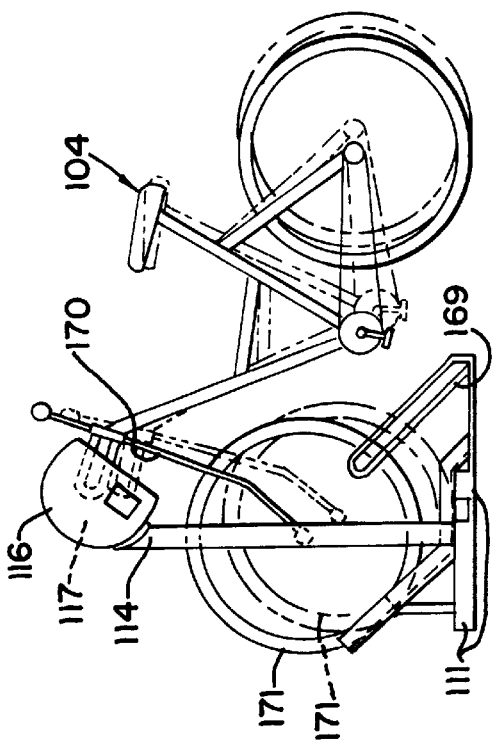
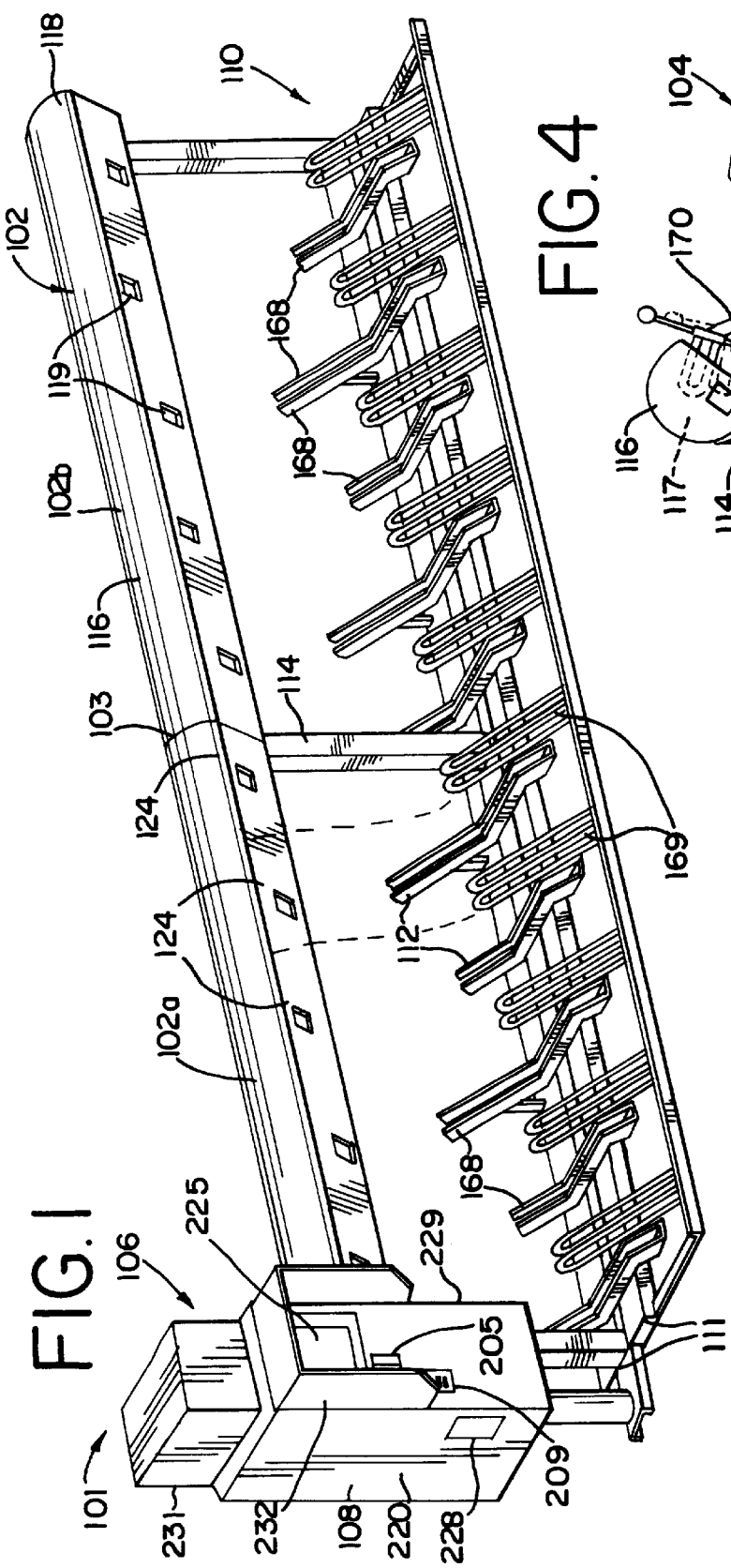

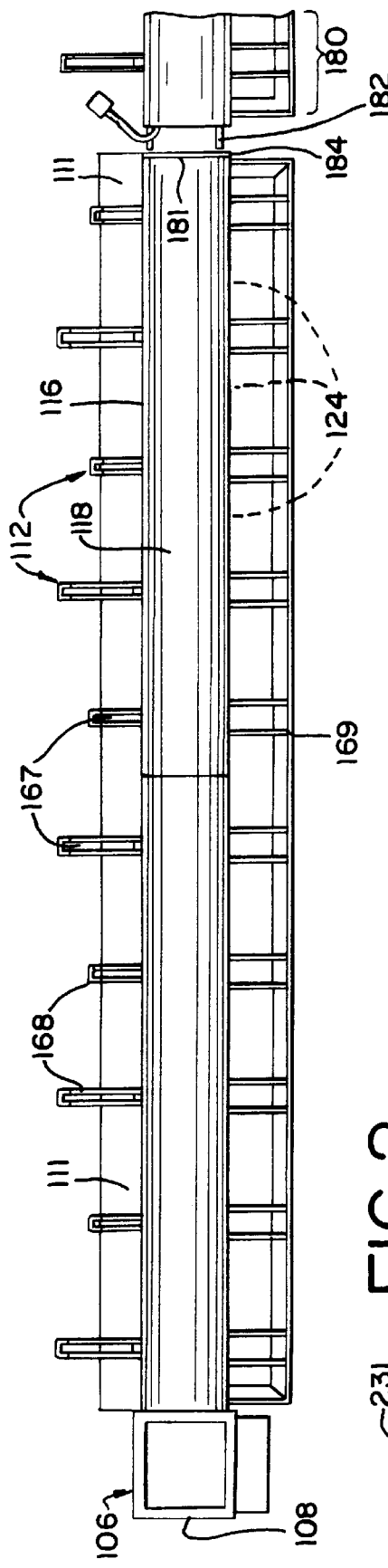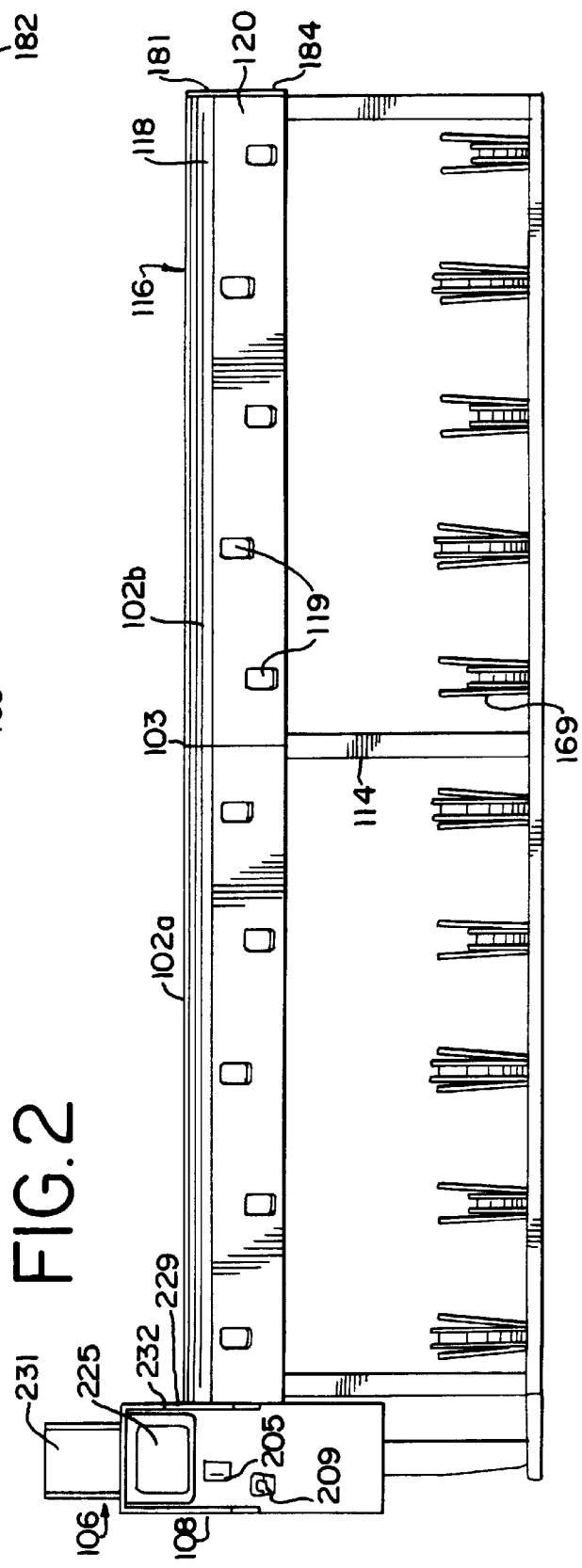

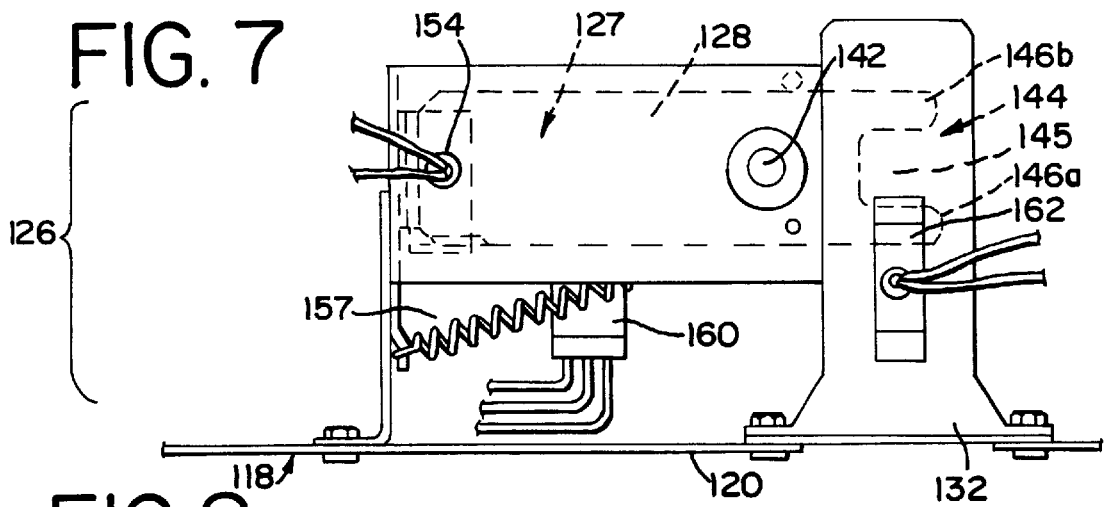
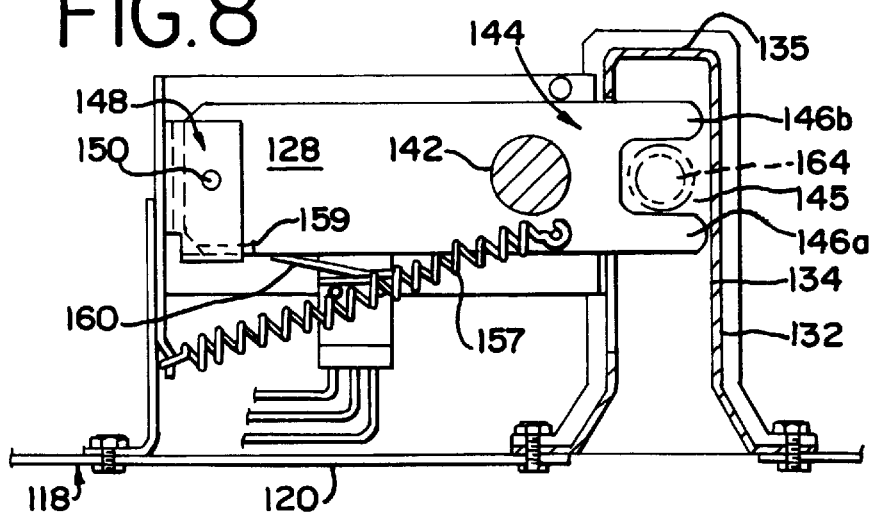
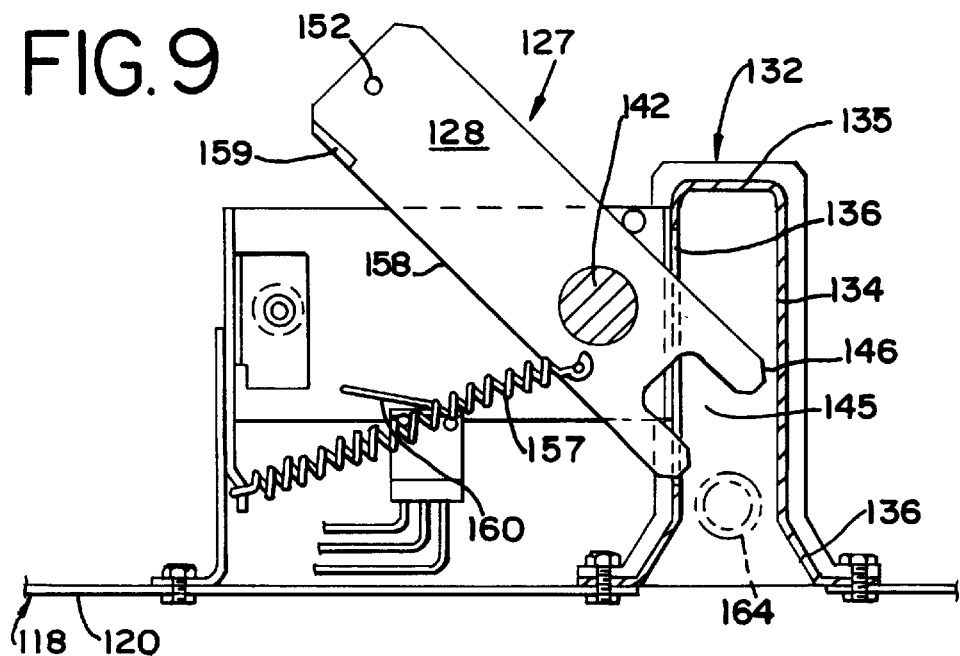

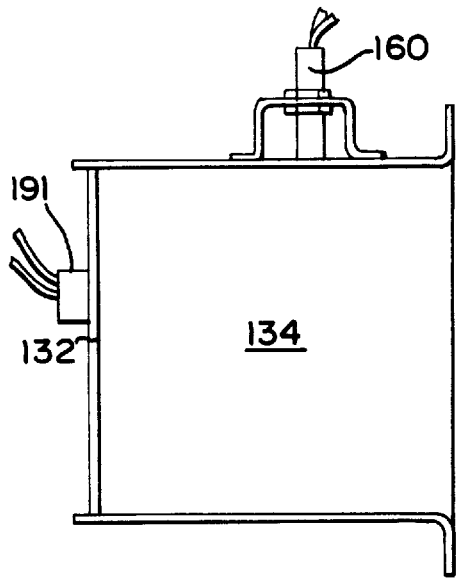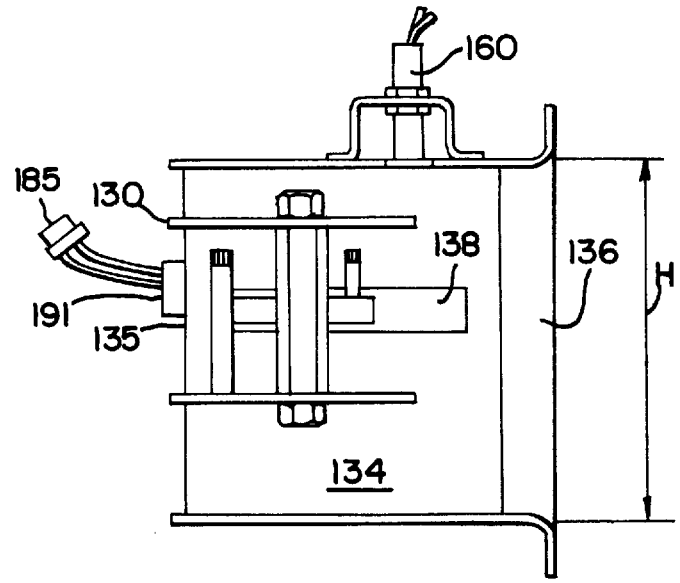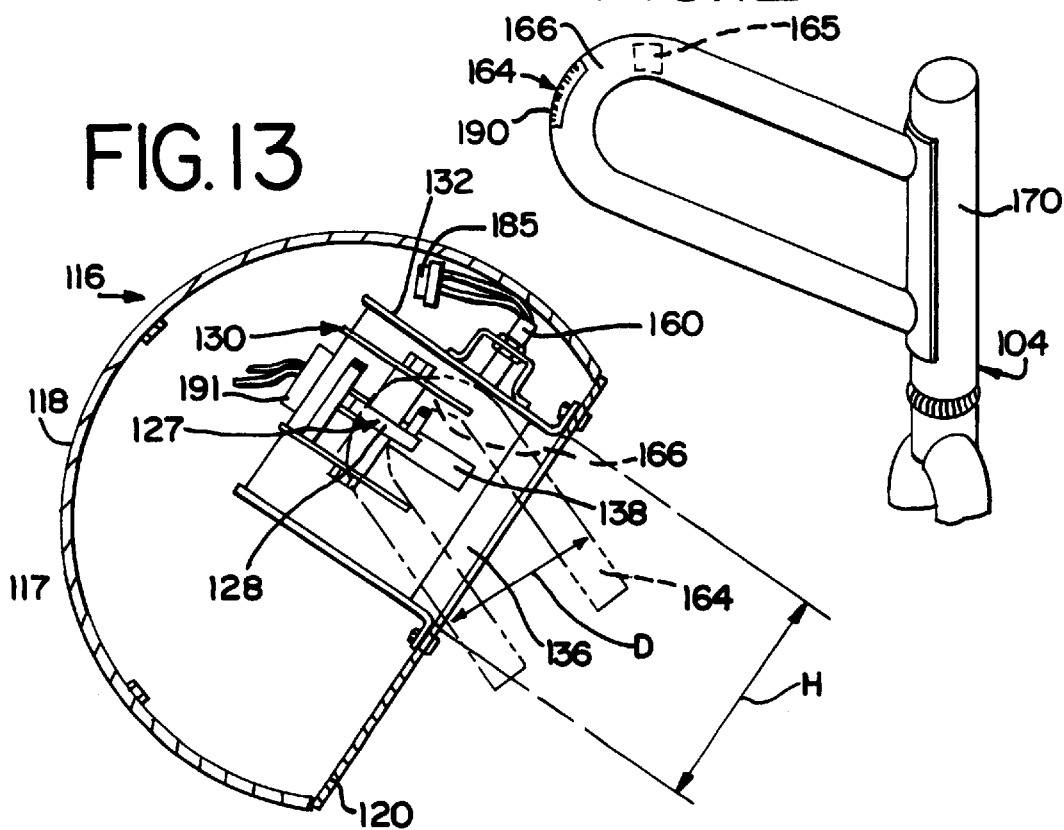

UNATTENDED AUTOMATED BICYCLE RENTAL STATION

BACKGROUND OF THE INVENTION

The present invention relates generally to systems for bicycle rentals, and more particularly, to an unattended, automated system for rental of bicycles.

Heretofore, the rental of bicycles has been accomplished by a manual operation. In such operations, the rental operator requires a central location that has enough space to accommodate a large inventory of bicycles. The rental is paid for by the renter by way of either a cash payment or a charge to a credit card. In either instance, the payment operation is entirely manual. The bicycle vendor must maintain a central location that has a large enough space to hold the inventory, which is expensive and costly, as well as employ manual labor at the central location to process rental transactions and to distribute and/or retrieve bicycles.

An automated bicycle rental station will eliminate the need for the large central location and eliminate much, if not all, of the labor costs associated with a manned operation. The prior art does not disclose or suggest any automated bicycle rental stations present. At best, the prior art includes some locking bicycle racks in the prior art that serve as bicycles "parking lots", but do not serve as automated rental facilities wherein one or more bicycles may be rented 24 hours a day.

Examples of such prior art are found in U.S. Pat. No. 4,433,787, issued Feb. 28, 1994 to Cook et al. and U.S. Pat. No. 4,830,167, issued May 16, 1989 to Lassche. Both of these patents utilize lockable bicycle racks in which a user locks his/her bicycle in the rack for a preselected amount of time. When the users return to these racks, they insert a bicycle "parking fee" payment in the form of deposited coins. When the payment is made, the bicycle is then released from the rack. Not only are both of these devices limited to the use of coins, thereby requiring labor to remove the coins deposited therein, but they also include complex locking mechanisms. Moreover and most importantly, neither of these prior art devices constitutes an automated bicycle rental station.

U.S. Pat. No. 5,278,538 that issued Jan. 11, 1994 to Ainsworth et al. describes another bicycle "parking lot" that includes a locking bicycle rack that does not accept coins as payment, but instead employs an electronic controller that accepts a debit card as payment. The locking mechanism employed by the Ainsworth et al. bicycle parking lot is complex and does not lend itself to a modular nature which would permit expansion or reduction at remote stations based upon the area usage. Inasmuch as Ainsworth et al. describes only a bicycle "parking lot", there is no disclosure or suggestion as to how to monitor any inventory of rental bicycles.

The present invention is directed to an automated system that overcomes two primary disadvantages of the typical bicycle rental station. Namely, it avoids the need for a central location with a large inventory space, and it performs the rental transaction in an automated manner, thereby dispensing with the need and cost for a clerk to operate the system at the rental location.

Other advantages of the systems of the invention include a self-contained remote bicycle rental station that can be installed in regions of high bicycle usage in open areas such as parks and near museums and in enclosed areas, such as parking garages of hotels or even by hotels and near bicycle trails or paths. The station includes a control component and a bicycle rental rack component, with the operation of the rental rack being controlled by the control component. The rental rack component is modular in nature, meaning that it may be fabricated in discrete sections that accommodate a preselected number of bicycles, such as 5 or 10 bicycles, so that multiple modules may be assembled to or taken from existing rental stations to increase or decrease the number of bicycles each rental station holds as inventory based upon usage patterns. Another advantage that the present invention offers over the prior art is that it permits bicycles to be rented at one location and returned at another location.

SUMMARY OF THE INVENTION

In one principal and in its simplest aspect as exemplified by one embodiment, the present invention includes a bicycle rental rack component, a control component and a supply of bicycles specifically designed for insertion into and removal from the bicycle rental rack.

In another principal aspect of the present invention, the supply of bicycles includes bicycles that have nonstandard size features and which are equipped with a portion, such as a lock bar, that engages the rental rack component to effect a locked retention of the bicycle in the rental rack. The lock bar may further include a unique identifier readable by the control component so that the bicycle supply may be uniquely identified and tracked in movements of individual bicycles from rental station to rental station.

In yet another principal aspect of the present invention, the rental rack component has a plurality of bicycle-receiving bays, each such bay being adapted to receive a rental bicycle therein, the rental bicycles including a plurality of standard bicycles having lock bars securely affixed thereto that are adapted to be received within and engaged by a locking mechanism operatively associated with each bicycle-receiving bay.

In still another principal aspect of the present invention, the bicycle rental rack component has a modular construction, with each module having the retention capability of accommodating a preselected number of bicycles such as 5 or 10 bicycles, so that the size of each rental station may be enlarged or diminished by such number of bicycles in order to accommodate usage patterns in the station area. In this regard, the rental rack component includes a base that extends along the ground and a bicycle engagement housing supported above the base and which extends generally parallel to the ground. The base preferably also includes a preselected number of bicycle-positioning ramps corresponding to the number of bicycles in the rental rack. These ramps extend upwardly from the base at an angle and accommodate the front wheels of the rental bicycles. They further direct the locking portions of the bicycles into openings of the engagement housing and into contact with individual locking mechanisms. The ramps further facilitate the user's removal of the bicycles by directing the bicycles downwardly out of the rental rack.

In a further principal aspect of the present invention, the bicycle engagement housing includes a elongated, hollow element that is supported above the base of the rental rack component. In the preferred embodiment, the housing takes the form of a truncated cylinder with a flat surface extending along the line of truncation to define an entry face of the housing. The entry surface includes a plurality of openings in the form of slots that extend into the body of the housing. Each opening has a locking mechanism associated therewith and which is operatively interconnected to the control component. The locking mechanisms are selectively actuatable into a locked position upon entry of a rental bicycle into the rental rack component and into the locking opening.

In yet a further principal aspect of the present invention and in the preferred embodiment, the control component includes an upstanding control tower, or console, that includes a payment acceptance means in the form of a credit card reader that into which a user may insert a credit card to rent a bicycle. The control console includes a payment verification means, preferably in the form of a modem, that permits communication with an off-site verification entity to verify the card used to pay for the bicycle rental and/or post the rental transaction to the user's appropriate account. The console further includes a control means that unlocks a bicycle from a specific location on the rental rack component as well as locks the returned bicycle in place on the rental rack component. Still further, the control console and the locking bar may include means for identifying the rental bicycle in order to track the bicycle in its rental and permit rental from one bicycle rental station and the return to another bicycle rental station. The control console permits continuous (24-hour) operation of the bicycle rental station and the rental bicycle identification means permits the user to rent a bicycle in one location and return it to another location.

In still a further aspect of the present invention, multiple rental stations may be operatively interconnected together by communications lines to form a "network" of rental stations, wherein the inventory of rental bicycles at each rental station may be monitored from a central command location, and the movement(s) of rental bicycles between rental stations may also be monitored. In order to instruct users of the rental stations how to rent bicycles and also to identify alternate rental and/or return rental stations, the control console of each rental station may include a touch-activated display screen that displays the bicycle rental protocol as well as displays maps of the surrounding area, rental network or advertising.

Accordingly, it is a general object of the present invention to provide an unattended, automated bicycle rental station having a locking bicycle rental rack component and a control component, the locking rental rack having a plurality of rental bicycle-receiving bays, the control component selectively controlling the locking and unlocking of bicycles located in the bicycle-receiving bays.

Another object of the present invention is to provide a bicycle rental system for monitoring the unattended rental of bicycles at one or more remote bicycle rental stations, each of the rental stations having a bicycle rack containing an inventory of rental bicycles, the bicycle rack having a plurality of bicycle-receiving bays, each of the bays having a bicycle locking assembly associated therewith that is selectively controlled by a control means, the control means being operatively interconnected to a control center whereby the inventory of bicycles at any rental station can be monitored.

A further object of the present invention is to provide a locking mechanism for a rental bicycle rack, the locking mechanism including a latch plate that is selectively movable between two positions, one position of the two positions being a locked position where the latch plate engages a portion of a bicycle and locks it in place on the bicycle rack and the other position being an unlocked position where the bicycle portion is disengaged from the latch plate, the locking mechanism including a pair of sensors for determining the position of the latch plate and for identifying a rental bicycle belonging to the bicycle rack.

Still another object of the present invention is to provide an unattended, automated bicycle rental station having a bicycle rental rack, an inventory of rental bicycles locked into a plurality of discrete bicycle-receiving bays on the rental rack and a control means for selectively unlocking designated bicycle-receiving bays to release a rental bicycle to a renter and for locking a returned rental bicycle into one of the bicycle-receiving bays, the control means accepting credit or other bank cards as payment for the rental of one or more bicycles, the control means of the rental station permitting continuous operation of the rental station without the expense of an attendant.

Yet another object of the present invention is to provide a bicycle rental system including a plurality of unattended, automated bicycle rental stations as described above, at least one of the rental station bicycle rental racks having a modular construction and therefore being comprised of modules which may be added to or taken from a rental station to increase or decrease the number of rental bicycles at that rental station.

Still yet another object of the present invention is to provide a bicycle rental network that includes a plurality of unattended, automated bicycle rental stations as described above that are operatively linked together via their respective control consoles to a central command center wherein rental transactions at the rental stations of the network may be monitored.

These and other objects, features and advantages of the present invention will be clearly understood through consideration of the following detailed description.

BRIEF DESCRIPTION OF THE DRAWINGS

In the course of the following detailed description reference will be frequently made to the accompanying drawings in which:

FIG. 1 is a perspective view of an automated bicycle rental station used with bicycle rental systems constructed in accordance with the principles of the present invention;

FIG. 2 is a front elevational view of the bicycle rental station of FIG. 1;

FIG. 3 is a top plan view of the bicycle rental station of FIG. 1;

FIG. 4 is an elevational sectional view of the bicycle rental station of FIG. 1 looking down the bicycle rental station illustrating the staggered arrangement of rental bicycles;

FIG. 7 is a top plan view of the locking assembly of FIG. 6;

FIG. 8 is a sectional view of the locking assembly of FIG. 6, taken along lines 8—8 thereof and illustrating a rental bicycle element locked in place within the locking assembly;

FIG. 9 is the same view as FIG. 8, but illustrating the locking assembly in an unlocked position where the rental bicycle element is released from the openings of the bicycle rental rack;

FIG. 10 is an end view of the locking assembly of FIG. 6, taken from the right-hand side end thereof when facing the rental rack;

FIG. 11 is an end view of the locking assembly of FIG. 6, taken from the left-hand side end thereof when facing the rental rack;

FIG. 12 is a detailed view of the locking element attached to a rental bicycle;

FIG. 13 is an enlarged sectional view of a portion of the locking housing of the rental rack component showing the location of a locking assembly in place therewithin and a rental bicycle locking element engaged therein;

DETAILED DESCRIPTION OF THE PREFERRED EMBODIMENTS

Overall System Description

Figure 5:
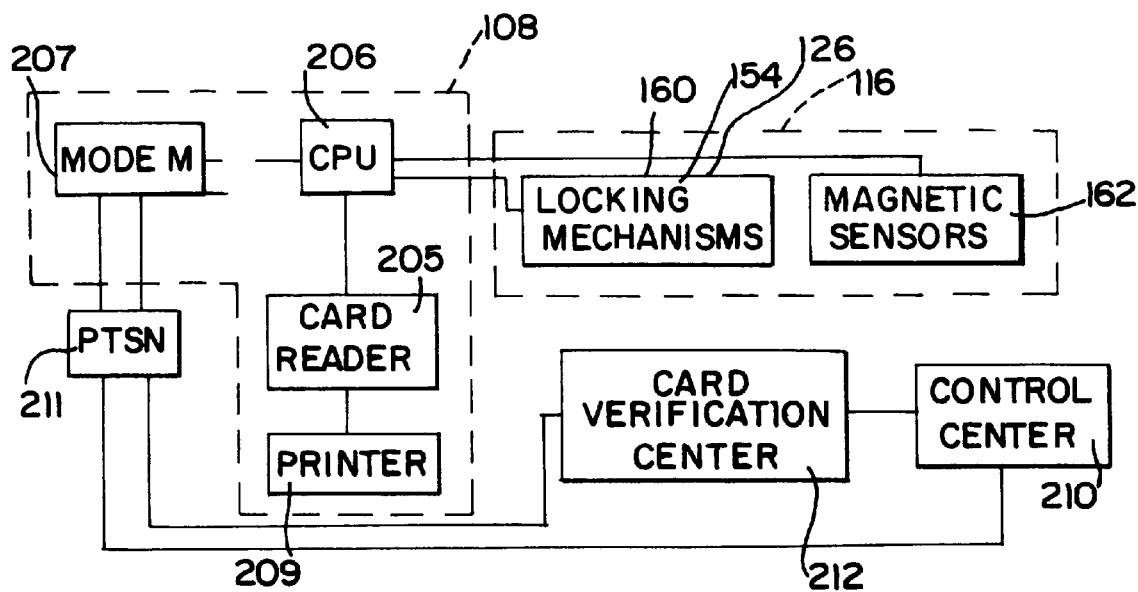
FIG. 5 is a block diagram of a single bicycle rental station illustrating the components of the rental station of FIG. 1 and their interconnection with each other and other system components.

Turning now to FIG. 1, an unattended automated bicycle rental system is illustrated generally at 100. The rental system 100 includes one or more unattended, automated bicycle rental stations 101 that may be interconnected to form a bicycle rental station network. Each rental station 101 includes a selectively lockable rental bicycle rack component 102, one or more rental bicycles 104 (FIG. 4) and a control component 106 shown illustrated as a control tower 108. The control tower 108, as explained in greater detail below, permits the selective unlocking of rental bicycles 104 located in certain bays 124 in the rental rack component 102. The control tower 108 also has the ability to charge the rental to a magnetic payment card, such as a credit card, debit card or other similar bank card as well as verify the validity of the bank card and monitor the remaining inventory of rental bicycles 104 in the rental rack component 102.

The Bicycle Rental Rack Component

The rental rack component 102 extends along the ground and includes a base 110 formed by a pair of elongated members 111 that are shown as inverted metal channels. The base members 111 support a plurality of bicycle positioning ramps 112 that are spaced apart from each other along the length of the base 110. The base 110 has one or more vertical posts, or stanchions 114, that are firmly affixed thereto and rise upwardly from the base 110. The posts 114 support an elongated bicycle-engagement or lock housing 116 above the base. In the preferred embodiment, the housing 116 is preferably a hollow element, shown in the drawings (particularly in FIG. 13) as a truncated hollow cylinder 118 having a plurality of bicycle-receiving openings 119 formed therein along a downwardly angled surface 120. Pairs of bicycle-receiving openings 119 in the lock housing 116 and bicycle positioning ramps 112 on the base 110 together cooperatively define a series of rental bicycle-receiving bays 124 along the length of the rack component 102. Each such bicycle-receiving bay 124 is adapted to lockingly hold a rental bicycle 104 therein. In this regard, each positioning ramp 112 of the bicycle-receiving bay 124 is aligned with a single lock housing opening 119. The rental rack component 102 may be fabricated in discrete sections 102a, 102b bolted together in a known manner along an interface 103.

Figure 14:
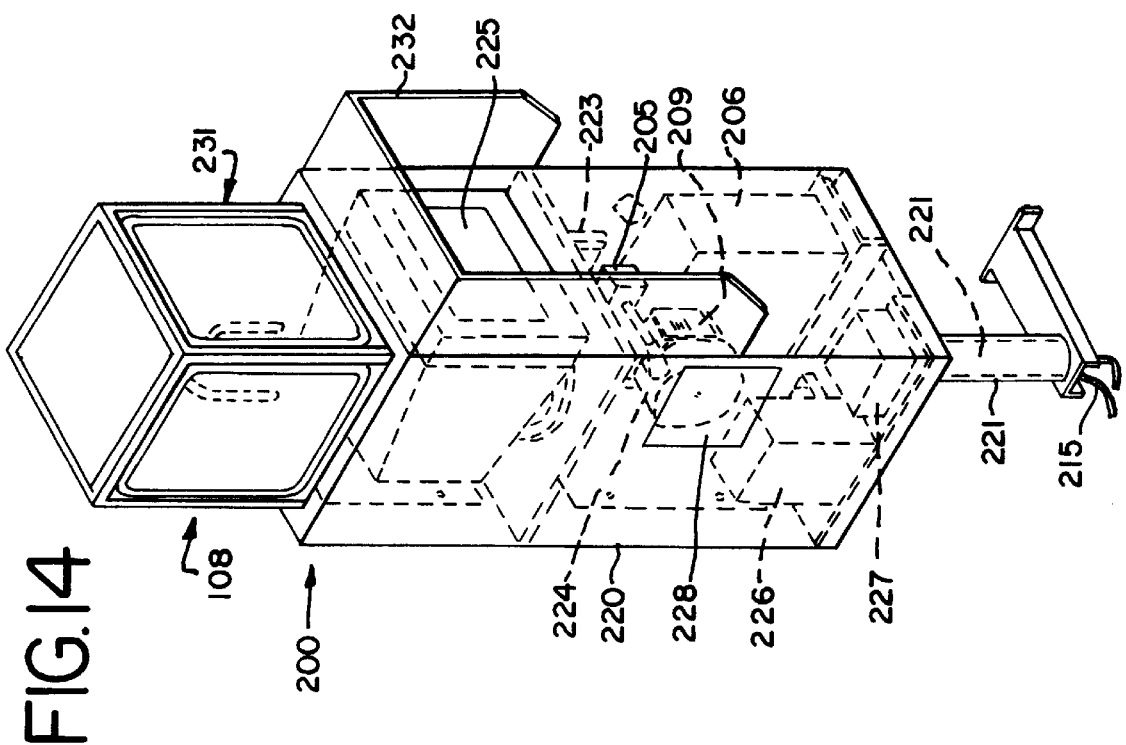
FIG. 14 is a perspective view of one embodiment of the control component used with the automated bicycle rental systems of the present invention, showing the internal components thereof in phantom.

In order to accommodate the optimum number of rental bicycles 104 in the least amount of space on the rack component 102 and in order to maintain the length of the rack component 102 at a minimum, the openings 119 are staggered in their elevation along the length of the housing 116. The positioning ramps 112 are also staggered in their respective elevations in the alternating fashion best shown in FIG. 1. This staggered arrangement coincides with the staggered arrangement of the lock housing openings 119 and it permits as shown in FIG. 14, the rental bicycles 104 to be spaced closely together in place on the rack component 102 without the handlebars 172 of adjacent rental bicycles 104 from interfering with each other. This facilitates a user's removal of the rental bicycle 104 from the rack component 102 as well as the return thereto.

The rental rack component 102 is typically constructed to accommodate a preselected number of rental bicycle-receiving bays 124, and the rental station 101 is illustrated in the Figures having ten such bays 124. Additional bicycle-receiving bays 124 may be added to an existing rental station 101 by way of rental rack extensions, or modules 180. These modules 180 will be similar to the rental rack sections 102a, 102b, illustrated. As shown in FIG. 3, the module 180 includes a locking housing 116 that may be abutted against the far end 181 of the existing station 181 and attached by suitable means such as engagement arms 182 that will extend into the interior 117 of the existing station housing 116. To facilitate the attachment, the rental station housing 116 preferably includes at its far end 181 a removable end plate 184 that is secured to the housing 116 to prevent unauthorized access to the interior 117 thereof, but may be removed by the rental station owner to add more bicycle-receiving bays 124 to the existing rental station 101. The module 180 includes the same hardware as the existing rental station 101, such as locking assemblies 126, bike positioning ramps 112 and the like. The electromechanical components of the module 180 may be connected to the control component 106 by way of wiring connectors 185 that will permit connection to the wiring at the end locking assembly 126 of the housing 116.

The Rental Rack Locking Assembly

In an important aspect of the invention, the housing 116 accommodates a plurality of individual locking assemblies 126 that correspond in number to the number of bicycle-receiving bays 124 disposed on the rental rack component 102. These locking assemblies 126 are individually selectively controlled by the control component 106 of the system 100. FIGS. 6 through 9 illustrate the details of the locking assemblies 126 depicted in the preferred embodiment. Each locking assembly 126 includes a movable latch member 127, shown as a latch plate 128, that is mounted for pivotal movement on a frame 130 of the locking assembly 126. The horizontal frame 130 is joined to a vertical hollow receptacle 132 that is adapted to be aligned with the lock housing openings 119, this receptacle 132 forms the interior and rear walls 134, 135 of the lock housing bicycle-receiving openings 119 and defines the depth of the bicycle-receiving openings 119. The interior walls 134 of the receptacle 132 may be slightly angled at the entrance of the receptacle 132 to provide guide surfaces 136 that will guide a portion 164 of the rental bicycle 104 into the lock housing opening 119 and receptacle 132.

A horizontal passage 138 is disposed in one of the receptacle interior walls 134 in alignment with the latch plate 120 to permit movement of the bicycle-engagement end 140 of the latch plate 128 into and partially out of the receptacle 132. The latch plate 128 is preferably mounted to the frame 130 by way of a pin assembly 142. The rental bicycle engagement end 140 of the latch plate 128 is illustrated as a yoke 144 that includes a central notch 145 flanked by two arms 146a, 146b. Preferably, the yoke 144 projects into the receptacle 132 as illustrated in FIGS. 7–9. So that in operation, the notch 145 of the latch plate 128 will engage and clamp the portion 164 of the rental bicycle 104 inserted in the receptacle 132. The other end of the latch plate 128 defines a locking end 141 of the latch plate 128 and is aligned with a fork element 148 of the locking assembly 126 that has two spaced-apart legs 149. These legs 149 define a slot 151 which the latch plate locking end 141 moves in and out of in operation of the system 100. The fork element 148 is mounted at an end of the lock assembly frame 130 and includes a pair of openings 150 passing through the fork legs 149. These openings 150 are aligned with a lock opening 152 formed in the locking end 141 of the latch plate 128.

Figure 6:
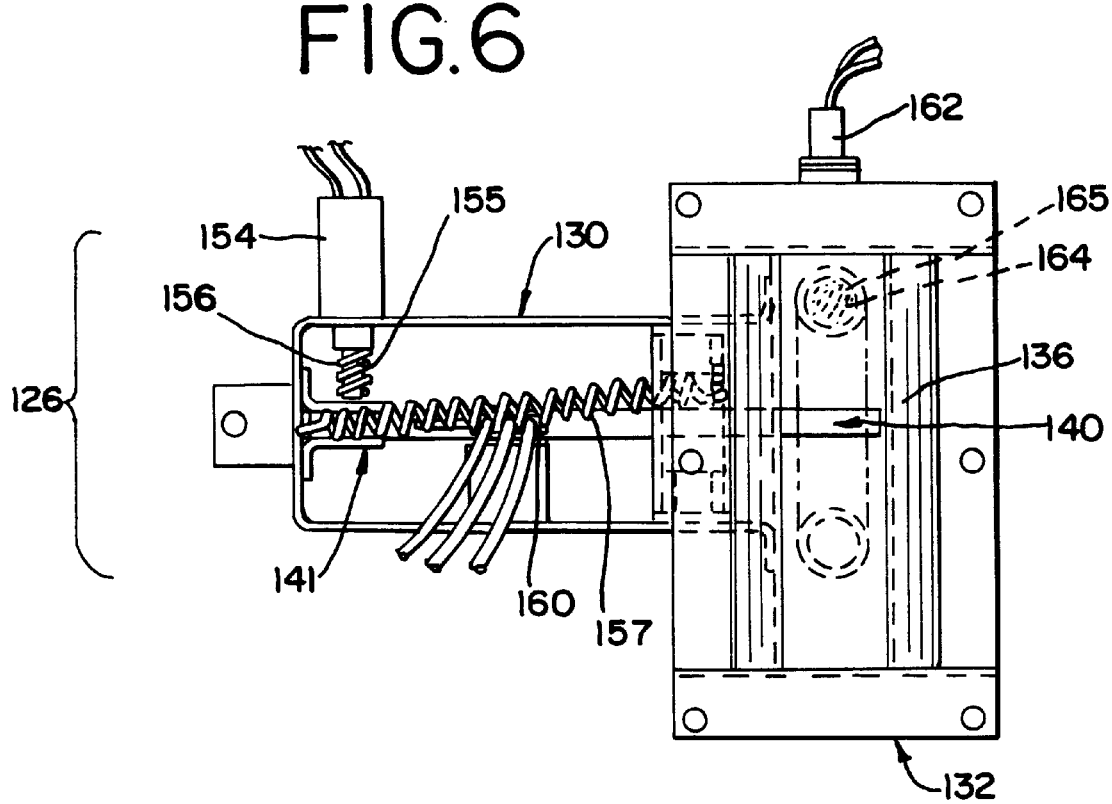
FIG. 6 is a front elevational view of a locking assembly used in the bicycle rental station of FIG. 1 and illustrating a rental bicycle locking element in place.

A selectively actuatable lock element 153 is supported by the frame 130 and is illustrated in the preferred embodiment as a solenoid 154 having a central shaft 155. The solenoid 154, and particularly the shaft 155 thereof, is aligned with the openings 150, 152 of the fork 150 and the latch plate 128. The shaft 155 of the solenoid 154 preferably has a stroke long enough to extend the shaft 154 through the openings 150 of the fork 150 and the opening 152 of the latch plate 128. When the shaft 154 extends through these openings 150, 152 the latch plate 128 is locked in place within the receptacle 132 as illustrated in FIGS. 6 and 8. The solenoid 154 is connected to a source of power in the control component 106 and may be energized to either displace its shaft 154 out of the solenoid body or draw it into the solenoid body. A compression spring 156 may be utilized in conjunction with the shaft 154 to apply a mechanical force to the shaft 154 in its stroke.

The latch plate locking end 141 may have its leading edge 158 beveled as shown at 159 to facilitate the entry of the latch plate locking end 141 into the fork 150 when a rental bicycle 104 is returned to the rental rack and inserted into a lock housing opening 119. A means to detect this movement of the latch plate 128 may be utilized in the locking assembly 126 and such means is illustrated in the figures as a limit switch 160 mounted to the frame 130 and is aligned with the latch plate 128. The limit switch 160 is actuated upon contact by the leading edge 158 of the latch plate 128 and, upon such contact, it sends a signal to the control component 106 in order to indicate that the latch plate 128 has moved into a position ready for locking.

In order to verify that a proper rental bicycle 104 that belongs to the rental station is being returned to the rental rack 102 when the latch plate 128 is moved into the aforementioned locking position, each lock assembly 126 includes a means for identifying the object inserted into the receptacle 132, as a rental bicycle 104. This identification means is illustrated in the preferred embodiment as a proximity sensor 162 that is mounted on one of the sidewalls 134 of the receptacle, illustrated in FIGS. 6 and 13 as the top sidewall. The proximity sensor 162 may incorporate a magnetic sensor that senses the presence of a magnetic field in the receptacle 132 and generates a signal to the control component 106 in response to such a presence.

In the preferred embodiment of the invention, each rental bicycle 104 is provided with a locking portion that is engageable with the rental rack 102, illustrated in FIGS. 4, 12 and 13 as a looped lock bar 164 that may be securely affixed, such as by welding or clamping to the front fork 170 of the rental bicycle 104. The rental bicycle lock bar 164 is preferably hollow and includes a magnet 165 disposed therein near the bight 166 of the lock bar 164, where it may be readily sensed by the proximity sensor 162. In one aspect of the present invention, the rental bicycles 104 may be specially constructed of non-standard size components to reduce the likelihood of theft of the rental bicycles 104 from the system. Alternatively, standard bicycles may be used as rental bicycles 104 of the system and in such instances, the rental bicycle lock bar 164 may be securely affixed, such as by welding, to the fork 170 of the rental bicycle 104.

The system 100 preferably employs "AND" logic to lock the rental bicycle 104 upon return. That is, the control component 106 will require a signal from the lock plate limit switch 160 "and" a signal from the proximity sensor 162 before it sends a signal to activate the solenoid 154 in order to lock the latch plate 128 (and rental bicycle 104) in place in the rental rack 102. As explained in greater detail below, this prevents the return of an improper bicycle to the rental rack 102. Both the limit switches 160 and proximity sensors 164 are connected to the control component 106 by wires 175. These wires 175 may be connected to the control component 106 by way of a common wire harness (not shown) that extends the length of the locking housing 116 and which includes a plurality of wire connectors (not shown) that receive opposing connectors 185 from each locking assembly 126. The use of such a wire harness is preferred when the rental station 101 is intended to be expanded by using the add-on modules 180 explained above.

A biasing spring 157 may be utilized in the manner illustrated in FIGS. 7–9 to apply a bias to the latch plate 128 to such an open, unlocked position, as illustrated in FIG. 9 when the solenoid locking shaft 155 is released from engagement. This bias keeps the latch plate 128 in a ready position to receive a rental bicycle 104 inserted into the receptacle 132 as well as pushes the rental bicycle 104 slightly away from the rental rack 102 when released. When a user returns a rental bicycle 104, the user guides the rental bicycle front wheel 171 onto one of the bicycle positioning ramps 112. The guide surfaces 136 of the receptacle sidewalls 134 will serve as a gross, or first guide means, to orient the rental bicycle lock bar 164 into the receptacle 132 of the lock assembly 126. One of (and preferably the rear one) of the latch plate yoke arms 146b extends into the receptacle 132 through the passage 138. The lock bar 164 will contact this yoke arm 146b and cause the latch plate 128 to pivot into a locking position (FIG. 8), whereupon it contacts the limit switch 160, when a proper signal is received from the proximity sensor 162, the control component 106 will trigger the solenoid 154 to lock the latch plate 128 and rental bicycle 104 in place.

The truncated surface 120 as mentioned above, is angled downwardly. This angle may be in the range of between about 50° to about 70°, and preferably is about 55°. The angled surface 120 cooperates with the upward angle of the bike positioning ramps 112 to assist in preventing the rental bicycle 104 from being lifted partially out of its bicycle-receiving bay 124 in order to apply a detrimental bending force, or movement, to the latch plate 128. Additionally, the height H of the entrance of the receptacle 132 preferably does not exceed the distance D between the legs of the lock bar 164 by more than one-third of D. This spatial relationship causes the lock bar 164 to contact and bear against either the top and bottom sidewalls 134 of the receptacle 132 when the lock bar 164 (and rental bicycle 104) is moved thereby preventing the application of detrimental forces directly to the latch plate yoke. In practice, a height H of 4.875 inches and lock bar distance D of 3.75 inches gives suitable results. In order to further assist in this security aspect, the bike positioning ramps 112 are fabricated in the form of channels having a base web portion 167 flanked by two upright sidewalls 168. The base 110 of the rental rack 102 may also be equipped with wheel guides in the form of relatively rigid wire loops 169.

The Rental Station Control Component

As mentioned above, the system 100 incorporates an on-site control component 106 illustrated as a control tower 108. This control tower 108 contains all of the operational elements required to perform the rental transaction at the individual bicycle rental station 101, except for payment authorization. In the simplest sense, the control components 106 of each station contain a magnetic card reader 205, an internal control computer or processor 206, a means to communicate with off-site facilities, such as a modem 207, an input device 208, such as a keypad or a touch display screen, and a transaction printer 209. As illustrated in FIG. 5, these elements are contained within the control component 106 and are operatively connected to the rental rack components 102 and to off-site facilities such as a system control center 210 and a magnetic card verification center 212. The modem 207 is utilized by the control component 106 to provide a data connection in a known manner to permit the exchange of data or information between the control processor 206 and any external control center. This data will normally comprise credit card account information, the number of bicycles rented in a given time period, and the inventory remaining in the rental station 101.

The control component 106 is envisioned to take one of two forms. FIG. 14 shows one embodiment 200 of a control tower 108 that is externally powered and is connected to a public telephone switching network ("PTSN") 211. This tower 200 has a durable metal housing 220 supported on a stand 221 that includes an interior, enclosed raceway 222 extending therethrough that contains both power and telephone transmission lines 215. A computer 206, preferably with a Pentium processor or equivalent and internal modem provides a means for controlling the operation of the rental rack and for storage of rental data, such as unique customer files. The modem permits the control tower 200 to communicate with an off site control center so that the rental activity of the station may be monitored. The computer 206 is linked to an I/O controller card 223 that receives as input, in a known manner, the signals from the locking assembly limit switches 160 and proximity sensor 162 and then sends as output activation signals the solenoid 154. In positioning a rental station 101 using this style control component, the stand 221 of the control tower 200 may be positioned over an underground wire vault and the wiring 221 may be connected to the existing wiring in the vault.

In order to obtain payment for the rental of the bicycles 104, a magnetic card reader 205 is provided and has the capability of receiving and reading the data on credit cards, bank cards, debit cards, transportation cards, student identification cards, and the like. In this regard, the terms "banking card" or "credit card" as used herein and in the appended claims are to have the broadest possible meaning and therefore refer to any of the cards referred to immediately above. The reader 205 may be a conventional one and may contain a slot into which the user's card is inserted and "swiped". The card reader 205 is operatively connected to the control processor 206, which is preferably programmed to open up a customer file corresponding to the billing number of the card. When a customer file is initially opened, the processor 205 dials out using the modem 207 to connect with a credit card verification center 212 located off-site from the rental station 101 which will send a verification signal back to the processor 205, indicating that the card is valid or not. If the card is not valid (or the credit limit thereof has been exceeded) the customer file is closed and the customer is prompted to insert another card. The rental and any deposit required for rental is charged to the card. In order to provide the customer with a receipt recording the rental transaction, the control tower 200 may also include a printer 209 and an associated supply roll 224 of printer paper, such as thermal imaging paper.

The control tower 200 also includes a means 208 for the customer to input his/her rental selection. This input means 208 is shown in the form of a "touch" display screen assembly 225 upon which various prompts may appear in accordance with how the control processor 206 is programmed. These prompts will appear on the display screen 225 and may be only information displays or they may be decisional displays on which the customer may indicate the desired number of bicycles to rent, the specific bicycle to rent, etc. The display screen 225, as mentioned in greater detail below during operation of the system, may display the rental agreement, rental instructions, maps of the rental stations in the network and advertising.

The externally powered control tower 200 preferably has an internal power supply 226 linked to the external power line as well as a battery back-up supply 227 in case of external power failure. Access panels 228 may be provided in the housing 220 to replace the printer paper supply 224 and other components. One side 229 of the control tower 200 abuts an opposing end of the rental rack 102 and includes a penetration 230 that is aligned with a similar penetration of the rack lock housing 116 to provide a path for wiring to extend between the two components 102, 106. A light assembly 231 may be located on the top of the tower housing 220 to provide lighting for easily locating the station 101. A light shield 232 may also be used with the housing to cut down glare at the display screen 225 as well as to provide a measure of privacy to the transaction.

Figure 15:
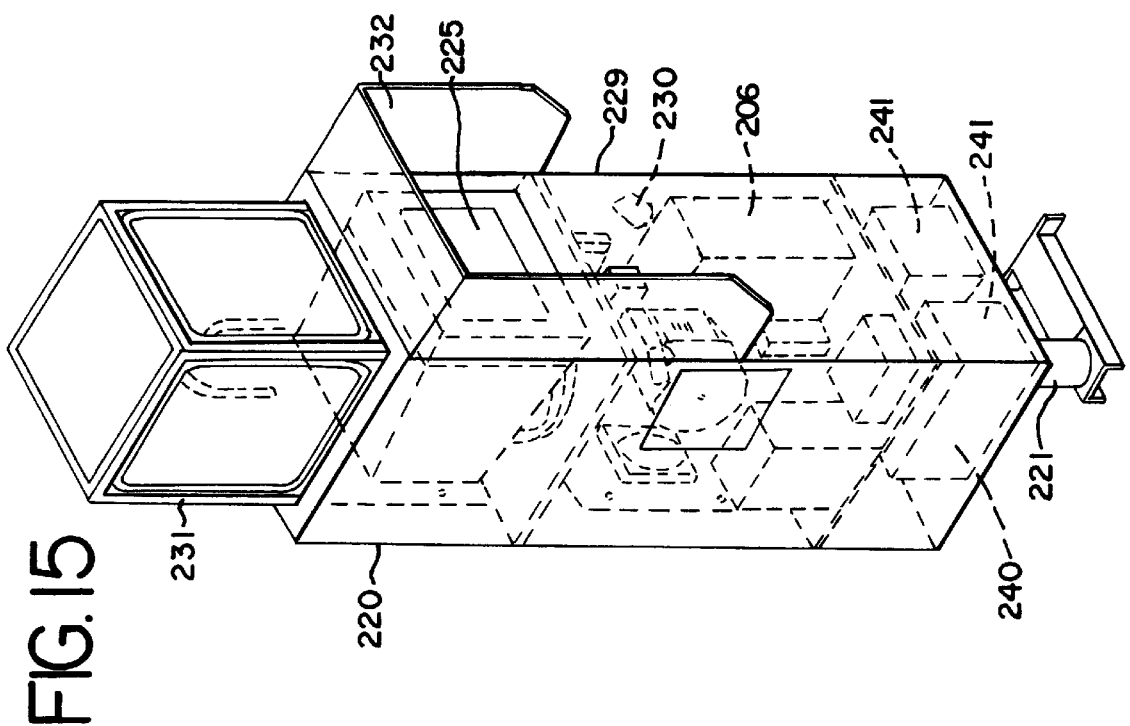
FIG. 15 is a perspective view of another embodiment of the control component used with the automated bicycle rental systems of the present invention, showing the internal components thereof in phantom.

Another embodiment of the control tower 202 is illustrated in FIG. 15. In this style, the tower 202 is equipped with the same operational components of the first control tower 200, but includes an internal power supply 240 in the form of two 12-volt batteries 241, such as lead-acid sealed batteries, with each battery having enough power to operate the station 101 for 10 to 14 days. If needed, a step-up or step-down transformer 242, this embodiment is suitable where there is no suitable access to external power and telephone lines. In this regard, the control tower 202 also preferably includes an internal cellular-style telephone 243 that the rental station 101 may use to dial up the off-site control center 210 and credit card verification center 212.

Operation of the Rental Station

In operation, the rental station 101 may initially have a complete inventory of rental bicycles 104, filling the ten bicycle bays 124 shown in the Figures. A renter approaches the display screen 225 of the control tower 108 which may display a generic "welcome" screen with instruction for operation. The renter will then insert a credit, bank or debit card into the card reader 205 and the computer 206 of the control tower 108 will read the unique number assigned to the card by the authority issuing the card, i.e., the credit card number. The station computer 206 then opens up a customer file within its memory. The customer file is identified by the card number and a rental agreement may then be displayed on the display screen 225 and a prompt to the renter to enter the number of bicycles sought to be rented. The customer inputs the total number by touching the display screen 225 or a keypad where no display screen is used.

When the customer file is opened, the computer 206, by way of its modem 207, dials up an off-site credit verification center 212 to verify if the card is valid and that credit remains on the card for charging purposes. If a denial of verification is given by the verification center 212, the customer is prompted by the display screen to insert a different card. If the customer does not, the file is closed and the transaction is terminated. When the validity of the customer's card is verified, the computer 206 will display a selection screen to the customer asking the customer to input the total number of bicycles to be rented.

The customer may next be prompted on the display screen 225 to select the particular bicycles 104 to be rented by inputting the bicycle bay number. Once entered, the computer 206 determines if those particular bicycle bays 124 have rental bicycles 104 in them by reading a locked signal from the particular locking assemblies 126. If a rental bicycle 104 is not present in one or all of the selected bays, an error display appears on the display screen 225 to inform the customer to choose different bicycle bays 124. When the customer enters proper numbers of the bicycle bays, the computer 206 sends a signal to the solenoids 154 of the locking assemblies 126 associated with those selected bays 124 and the solenoid locking shaft 155 is withdrawn form the associated latch plate 128. Due to the elevation of the bicycle positioning ramps 112, the selected rental bicycles 104 will drop down slightly from their locked position under the urging of the biasing spring 157 (FIG. 4) to visually indicate to the customer that the selected rental bicycles 104 are free.

The number of bicycles rented is entered into the customer's file and a timer in the form of a clock chip in the central processor 206 or other suitable timing means is started to record the time of the rental for that rental. When the customer returns the rental bicycle(s), the customer reinserts the card used to start the transaction and the computer 206 thereupon retrieves the customer's file that was stored in a data file under the customer's credit card number. The display screen 225 may then display a prompt asking the customer if all the rental bicycles 104 are being returned. The display screen 225 will then prompt the customer to insert the rental bicycle 104 into an open bicycle-receiving bay 124. The customer guides the front wheel 171 of the bicycle through the wire guides 169 and onto the associated bicycle positioning ramp 112.

The bicycle 104 is advanced by the user until the bicycle lock bar 164 enters its associated locking housing opening 119 on the rental rack 102. The guide surfaces 136 of the receptacle 132 within the housing 116 will direct the lock bar 164 into the receptacle 132 where it contacts the rear arm 146b of the latch plate yoke 144. Continued forward movement of the returned bicycle 104 will move the latch plate 128 into a locking position as in FIG. 8 when its lock opening 152 is aligned with the lock openings 150 of the fork 148. At this position, the leading edge 158 of the latch plate 128 will contact the limit switch 160, that sends a signal to the computer 206 indicating that some sort of object is present in the receptacle slot and that the latch plate 128 has been moved into a locking position. The computer 206 then looks for a positive signal from the proximity sensor 164 indicating that the object inserted therein is indeed a rental bicycle 104 belonging to the rental station. When the two positive signals are received from the limit switch 160 and the proximity sensor 164, the computer 206 will energize the solenoid 154 to lock the latch plate 128 and the rental bicycle 104 in place. Thus, it will be understood that the magnet 165 in the bicycle lock bar 164 acts as a "trigger" to effect the locking of the bicycle 104 into the rack 102. The magnet 165 also indicates when the rental bicycle 104 is removed from the rental rack 102 and tells the processor 206 how many bicycles 104 remain in the rack at the particular location. The steps for these rental and return transactions are indicated in the flow charts of FIGS. 17 & 18, and it will be understood that the order of the steps indicated therein may be arranged to suit the needs of the rental station 101 or the network 100.

Figure 17:
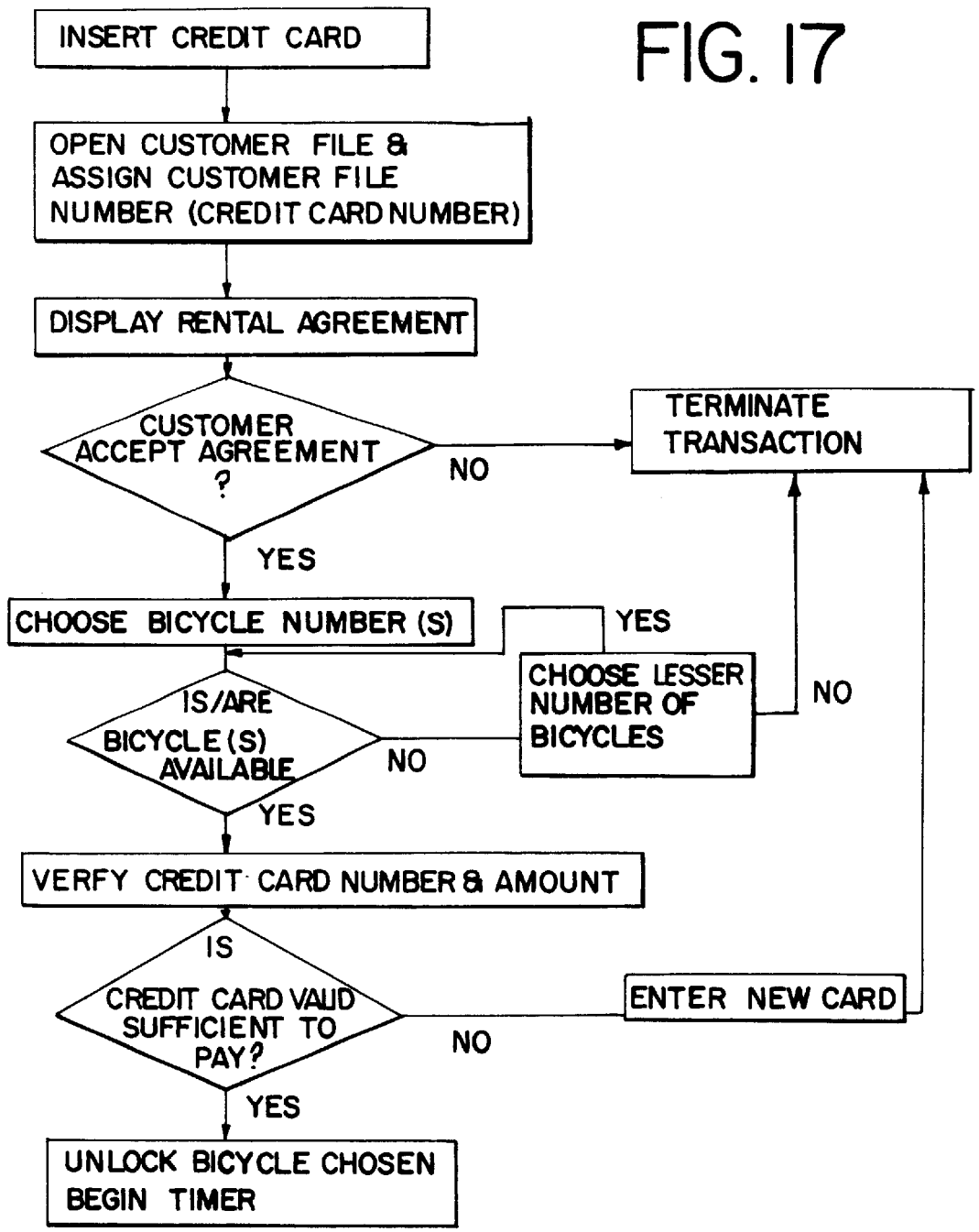
FIG. 17 is a flow chart of the obtaining of a bicycle as part of a bicycle rental transaction; and, FIG. 18 is a flow chart of the return of a bicycle and the closing out of a bicycle rental transaction.
Figure 18:
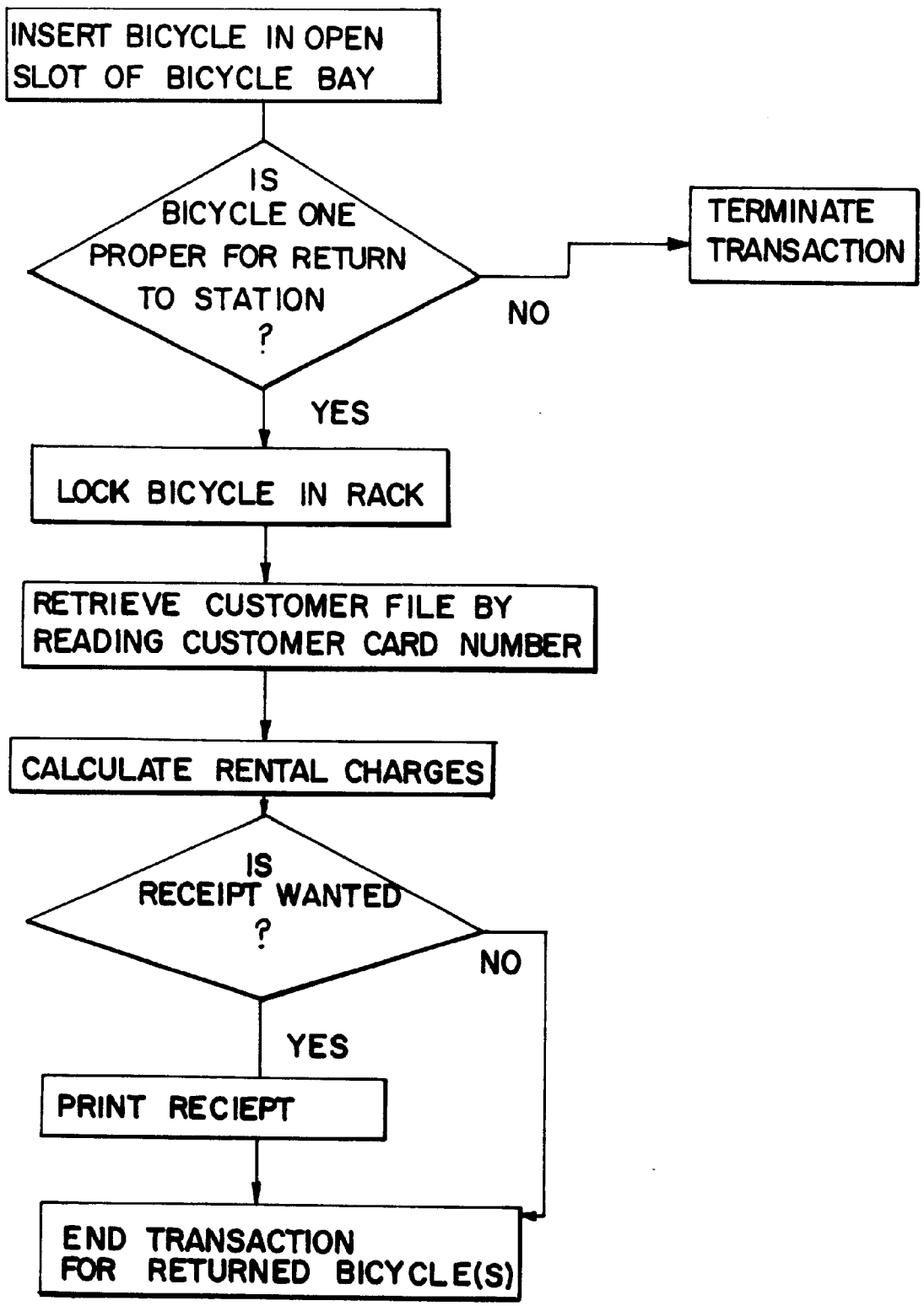

The return and locking of the rental bicycle may be done by the customer prior to inserting the customer card to access the customer file. In this regard, it should be noted that the locking of the bicycle 104 is entirely independent of the customer card insertion. Once the bicycle 104 is returned and the customer's card inserted, a calculation of the rental charge(s) is made and billed to the customers card. FIGS. 17 and 18 are flow charts illustrating these steps. It will be understood that the display prompts may be varied from those explained above and still obtain the desired results.

The display screen may also display a prompt asking the customer if a receipt recording the rental transaction is desired. If the customer chooses to obtain a receipt, the computer 206 will instruct the printer 209 to print one. The receipt is accessible by the customer through an access door.

Operation of the Rental Station System

Multiple rental stations 101 may be interconnected or "networked" together for use as part of an overall system, or network, 100 which may be monitored from an off-site control center 210. This control is effected by the control center 210 accessing the control computer 206 of each rental station 101 and retrieving rental charges, frequencies of rental as well as determining a total usage factor for the locations where each rental station 101 is located. This will permit an operator at the control center 210 to monitor usage patterns and deliver additional inventory, either in the form of bicycle rack extension modules 180 or additional rental bicycles 104. In instances where each rental bicycle is given an identifier element 190 as explained above, the control center 210 may be used to monitor the rental of bicycles 104. This monitoring is beneficial in that it can "track" the movement of bicycles between stations 101 of the system 100. In instances where bicycles 104 are rented at one location, but are returned at another location, an operator of the control center 210 can then determine that additional rental bicycles 104 are needed to replenish inventory at the one location. Additionally, with its ability to monitor the inventory at each rental station 101, the control center 210 may issue a prompt to certain rental stations whose rental racks that are filled (or whose inventory of rental bicycles has been depleted) advising customers at that rental station of the nearest rental station that has additional bicycles or bicycle return space. Additionally, the networking together of multiple rental stations 101 permits a renter to rent a bicycle 104 at one location and return it to another location. Such a networked system may be used as a "commuter" system, for example, wherein one set of rental stations may be placed at commuter train stations and other rental stations placed at large office buildings in a downtown area to provide short trip, low-cost transportation in urban areas.

Figure 16:
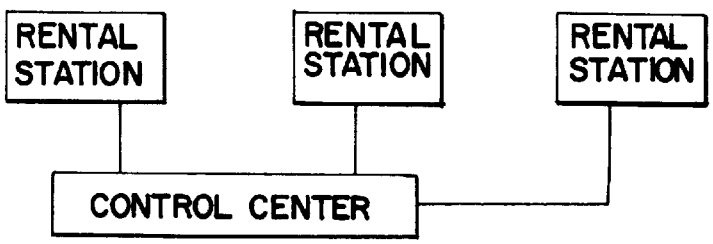
FIG. 16 is a block diagram of a bicycle rental network incorporating plural bicycle rental stations.

In instances where the rental station 101 in part of a network of rental stations, such as shown in FIG. 16, it may be desirable to uniquely identify each rental bicycle 104 to permit a user to rent it from one rental station and return it to another rental station. This may be accomplished by applying a unique identifier to each rental bicycle 104 such as a code 190 (FIG. 12) or other similar means on the lock bar bight 166 so that the bar code may be read when the lock bar 164 is inserted into the receptacle 132. A suitable means for reading these identifiers, such as a bar code reader 191 may be mounted on the receptacle 132 as shown.

The present invention may by utilized outdoors near lake fronts, in parks, at museums, zoos or the like and may also by utilized in association with hotels, motels or the like. In order to reduce the likelihood of theft with vandalism, the rental bicycles are preferably made of non standard size with uniquely sized wheel and durable frame construction so that the individual parts thereof will be of no use to thieves. Additionally, it is preferred that the wheels include solid or puncture-resistant tires.

While the preferred embodiment of the invention have been shown and described, it will be apparent to those skilled in the art that the embodiments are merely illustrative of some of applications of the principles of the present invention and that changes and modifications may be made therein without departing from the spirit of the invention, the scope of which is defined by the appended claims.

We claim:

1. An automated bicycle rental station for the unattended rental of bicycles, comprising: a bicycle rack; at least one rental bicycle insertable into and removable from the bicycle rack, the rental bicycle having a locking element disposed thereon; a locking assembly associated with said bicycle rack for locking the rental bicycle to said bicycle rack, the rental bicycle locking element being insertable into and removable from the locking assembly, said locking assembly being operable between first and second positions wherein in the first position, said locking assembly engages said rental bicycle locking element and locks said rental bicycle to said bicycle rack and wherein in the second position, said locking assembly disengages said rental bicycle locking element and unlocks said rental bicycle from said bicycle rack, thereby permitting it to be used by a customer; and, control means for operating said locking assembly between said first and second positions.

2. The automated bicycle rental station of claim 1, wherein said bicycle rack includes a base for supporting said bicycle rack in place on a ground surface, a lock housing spaced apart from and disposed above said base, and said bicycle rack includes at least one bicycle-receiving bay disposed on said bicycle rack, the bicycle-receiving bay including at least one guide member supported by said base and defining a path leading toward said lock housing, the guide member being adapted to receive at least one wheel of said rental bicycle.

3. The automated bicycle rental station of claim 2, wherein said lock housing includes an opening adapted to receive the rental bicycle locking element, said locking assembly communicating with the lock housing opening and adapted to selectively engage and disengage said rental bicycle locking element in proximity to said lock housing opening.

4. The automated bicycle rental station of claim 2, wherein said rental bicycle locking element projecting outwardly from said rental bicycle and said lock housing includes an opening adapted to receive the rental bicycle locking element therein, said lock housing opening being aligned with said guide member, said lock housing opening and said guide member respectively defining upper and lower limits of said bicycle-receiving bay.

5. The automated bicycle rental station of claim 1, wherein said bicycle rack includes a plurality of bicycle-receiving bays and a plurality of additional locking assemblies, each of said additional locking assemblies being operatively associated with a single bicycle-receiving bay, said control means being operatively linked to each of said locking assemblies.

6. The automated bicycle rental station of claim 5, wherein said bicycle rack includes a base and an elongated housing disposed above said base and spaced apart therefrom, said locking assemblies being supported within said lock housing and in alignment with said bicycle-receiving bays.

7. The automated bicycle rental station of claim 1, wherein said bicycle rack includes an elongated housing that houses said locking assembly and receives a portion of said rental bicycle therein when said locking assembly is in said first position.

8. The automated bicycle rental station of claim 7, wherein said housing includes a hollow, truncated cylinder, the truncated cylinder defining a surface of said housing angularly disposed with respect to said base, said housing including at least one opening disposed on the angled surface, the housing opening including a receptacle for receiving said rental bicycle locking element, and said locking assembly including a latch partially moveable in and out of said receptacle to respectively lock said rental bicycle to said rental station and unlock said rental bicycle from said rental station.

9. The automated bicycle rental station of claim 8, wherein said latch is movably mounted on said locking assembly, and wherein said receptacle includes a passage aligned with said latch, said latch extending through said passage and partially into said receptacle.

10. The automated bicycle rental station of claim 8, wherein said locking assembly includes a latch pin and said latch includes two opposing ends, one of said latch ends being an engagement end that is adapted to engage said rental bicycle when said locking assembly is in said first position and the other of said latch ends being a lock end that is adapted to be selectively engaged and disengaged by said latch pin upon command by said control means.

11. The automated bicycle rental station of claim 1, further including a control housing and control means, a base for supporting said bicycle rental station on the ground, and a lock housing disposed above said base, the control housing being disposed on said bicycle rental station in proximity to said lock housing, said locking assembly being operatively linked to said control means, said control means including means for accepting payment by a customer for rental of said rental bicycle.

12. The automated bicycle rental station of claim 11, wherein said rental payment acceptance means includes means for electronically reading account information on a payment card and means for determining the validity of said payment card.

13. The automated bicycle rental station of claim 12, wherein said control means further includes means for creating a customer file to record information concerning said rental of said rental bicycle and memory means for storing said customer file.

14. The automated bicycle rental station of claim 13, wherein said customer file recorded information includes the time and charges associated with said rental of said rental bicycle.

15. The automated bicycle rental station of claim 13, further including means for applying a unique customer file number to said customer file.

16. The automated bicycle rental station of claim 14, wherein an account number of said payment card is used as said unique customer file number.

17. The automated bicycle rental station of claim 1, wherein said rental bicycle rental bicycle locking element including an identification element that identifies said rental bicycle as belonging to said rental station and said locking assembly includes means for sensing the presence of said rental bicycle locking element identification element.

18. The automated bicycle rental station of claim 16, wherein said sensing means includes means for generating a positive identification signal to said control means that identifies said rental bicycle as belonging to said rental station and said locking assembly further includes means for actuating said locking assembly into said first position upon receipt of said positive identification signal from said sensing means.

19. The automated bicycle rental station of claim 1, further including a lock housing and the lock housing having a receptacle adapted to receive the rental bicycle locking element therein, said locking assembly including a latch partially disposed in said receptacle, the latch being moveable into and out of engagement with said rental bicycle locking element present in said receptacle, said locking assembly including means for sensing the presence of said rental bicycle locking element in a proper position for locking in said receptacle.

20. The automated bicycle rental station of claim 19, wherein said locking assembly further incudes means for verifying that an object inserted into said lock housing receptacle is a rental bicycle locking element.

21. The automated bicycle rental station of claim 20, wherein control means operates said locking assembly into a closed position upon receipt of a signal from said rental bicycle locking element presence sensing means with a signal from said rental bicycle locking element verification means.

22. The automated bicycle rental station of claim 8, wherein said housing surface is disposed at an angle to said base of between about 50° and about 70°.

23. The automated bicycle rental station of claim 1, further including a control center for monitoring bicycle rentals that occur at said rental station, the control center being positioned at a location remote from said rental station, said rental station including means for communicating with said remote control center and for transmitting information about bicycle rentals that occur at said rental station to said remote control center.

24. The automated bicycle rental station of claim 23, wherein said rental station communication means includes a modem connection to a public telephone switched network.

25. The automated bicycle rental station of claim 23, wherein said rental station communication means includes a modem connected to a cellular telephone.

26. An automated bicycle rental system comprising: a plurality of automated bicycle rental stations, each of the rental stations having a lockable bicycle rack and a control means associated therewith, each of the bicycle racks including a plurality of bicycle-receiving bays, each of said bicycle racks having a preselected number of rental bicycles operatively associated therewith so that a single rental bicycle is disposed in a single bicycle-receiving bay, each said rental station having a plurality of locking assemblies associated with each said rental station bicycle rack thereof so that a single locking assembly is associated with a single bicycle-receiving bay, each said control means of each said rental station being operatively connected to said locking assemblies of said rental station, said control means controlling operation of said associated rental station locking assemblies between first and second positions wherein said locking assemblies respectively lock and unlock said rental bicycles to said rental station by respectively engaging and disengaging locking elements disposed on said rental bicycles, said system further including a central control center for monitoring bicycle rental that occur at each of said rental stations, said central control center being located remote from any of said rental stations, each of said rental station control means being operatively linked to said control center.

27. The automated bicycle rental system of claim 26, wherein at least one of said rental stations includes means for electronically accepting payment from a customer for a bicycle rental, means for verifying the ability of said customer to pay for said bicycle rental and means for timing the duration of said customer's bicycle rental.

28. The automated bicycle rental system of claim 27, wherein said electronic payment acceptance means includes an electronic card reader for reading account information from a banking card of a customer seeking to rent a rental bicycle from said rental station, means for determining the validity of said banking card, means for recording the amount of time said customer has rented said rental bicycle.

29. The automated bicycle rental system of claim 26, wherein each of said rental stations includes means for communicating with said central control center in the form of a telephone modem.

30. The automated bicycle rental system of claim 26, wherein each of said rental stations includes means for communicating with said central control center in the form of a telephone modem, said modem being adapted to transmit information about bicycle rentals occurring at said rental stations to said central control center.

31. An automated, unattended bicycle rental system, comprising: a locking bicycle rack having a bicycle-receiving bay; a rental bicycle received in said bicycle-receiving bay and locked to said bicycle rack; locking means securing said rental bicycle to said bicycle rack, the locking means being movable between an unlocked position and a locked position to selectively release said rental bicycle from said bicycle rack and to lock said rental bicycle to said bicycle rack; control means for controlling said locking means in said locked and unlocked positions; a card reader means for reading information from a bank card to enable a user to pay for a rental of said rental bicycle by way of a bank card, said control means being operated in response to insertion of a user's bank card into said card reader means, whereby insertion of said bank card conditions said locking means for movement to said unlocked position; timer means for recording a length of time said rental bicycle is rented and removed from said bicycle rack; and, calculating means for calculating a rental charge based said recorded rental time.

32. A locking assembly for a bicycle rental station, the rental station having a bicycle rack, the bicycle rack having a housing with at least one receptacle disposed therein that is adapted to receive a locking element extending from a frame portion of a rental bicycle therein, the locking assembly comprising: a frame, a latch member movably mounted on the frame, between first and second operative positions, the latch member partially extending into said housing receptacle, said locking assembly further including a spring biasing said member toward said second position, and a selectively operable latch pin for securing said latch member in said first position.

33. An automated, unattended bicycle rental station for the unattended rental of bicycles, comprising:

a bicycle rack, the bicycle rack including an elongated housing supported on a base, said bicycyle rack having a preselected number of bicycle-receiving bays disposed thereon, said housing and said base cooperating to define portions of said bicycle-receiving bays;

a preselected number of rental bicycles, a single rental bicycle being received in a single bicycle-receiving bay of said bicycle;

a plurality of locking assemblies disposed along said lock housing, a single locking assembly being associated with a single bicycle-receiving bay, each said locking assembly having a latching member movable between first and second operative positions, wherein in said first position said latching member engages a locking portion of an associated rental bicycle and locks said rental bicycle to said bicycle rack lock housing via said rental bicycle locking portion, and wherein in said second position said latching member disengages said associated rental bicycle portion to unlock said rental bicycle from said bicycle rack; and, first means for actuating locking assembly latching member into said second position, the first actuating means including means for reading information from a credit card and means for verifying the validity of the credit card, whereupon determining that a credit card read by said credit card reading means is valid, said first actuating means actuates said locking assembly and said latching member moves into said second position and unlocks said rental bicycle portion from said bicycle rack.

34. The automated bicycle rental station of claim 33, further including a bicycle rack extension portion for attachment to said bicycle rack, the bicycle rack extension portion having a housing portion and a base portion that to cooperatively define an additional member of bicycle-receiving bays, said bicycle rack extension portion increasing the capacity of said bicycle rental station by additional bicycle-receiving bays to said bicycle rack.

35. The automated bicycle rental station of claim 34, wherein said bicycle rack extension includes a plurality of additional locking assemblies, a single additional locking assembly being operatively associated with a single additional bicycle-receiving bay of said bicycle rack extension, and said rental station includes means for operatively interconnecting said additional locking assemblies with said rental station control means.

36. The automated bicycle rental station of claim 33, wherein said housing includes a plurality of openings and said rental bicycles include projecting lock elements that are adapted to be received within said housing openings for locking said rental bicycles to said bicycle rack.

37. The automated bicycle rental station of claim 33, further including second means for actuating said locking assembly latching member into said first position to lock said rental bicycle to said bicycle rack, said second actuating means including a first sensor that senses the presence of said latching member in said first position and a second sensor that senses the presence of a rental bicycle projecting lock element within said housing opening.

38. A method of renting bicycles in an unattended manner, comprising the steps of:

providing a bicycle rental station having at least one rental bicycle, the rental bicycle having at least one locking element disposed thereon and a locking bicycle rack, the locking bicycle rack having a locking assembly associated therewith adapted to selectively lockingly engage and disengage the rental bicycle locking element;

providing a control means in association with said bicycle rental station, the control means including means for reading information of a bank card;

reading the information from a bank card inputted into said control means by a rental bicycle user;

establishing the validity of said bank card;

disengaging said locking assembly from said rental bicycle locking element to permit said user to remove said rental bicycle from said locking bicycle rack;

recording the amount of time said rental bicycle is removed from said locking bicycle rack;

calculating a rental charge based upon said recorded time; and, charging said rental charge to said bank card.

39. An automated bicycle rental station for the unattended rental of bicycles, comprising:

a bicycle rack, the bicycle rack having a base for supporting said bicycle rack in place on a ground surface, a lock housing spaced apart from and disposed above said base, said bicycle rack including at least one bicycle-receiving bay disposed on said bicycle rack;

at least one rental bicycle insertable into and removable from the bicycle rack, the rental bicycle having a locking portion formed on a frame of said rental bicycle;

a locking assembly associated with said lock housing for locking said rental bicycle to said bicycle rack, said lock housing including at least one opening disposed thereon that defines a receptacle for receiving said rental bicycle locking portion, the locking assembly being operable between first and second positions wherein in the first position, said locking assembly locks said rental bicycle to said bicycle rack by engaging said rental bicycle locking portion, and wherein in the second position, said locking assembly unlocks said rental bicycle from said bicycle rack by disengaging said rental bicycle locking portion, thereby permitting it to be used by a customer, said locking assembly including a latch partially moveable in and out of said receptacle and engageable and disengageable with said rental bicycle locking portion to respectively lock said rental bicycle to said rental station and unlock said rental bicycle from said rental station;

and, control means for operating said locking assembly between said first and second positions.

40. An automated bicycle rental station for the unattended rental of bicycles, comprising:

a bicycle rack;

at least one rental bicycle insertable into and removable from the bicycle rack, the rental bicycle having a locking element associated therewith;

a locking assembly associated with said bicycle rack for locking the rental bicycle to said bicycle rack, the locking assembly being operable between first and second positions wherein in the first position, said locking assembly locks said rental bicycle to said bicycle rack and wherein in the second position, said locking assembly unlocks said rental bicycle from said bicycle rack, thereby permitting it to be used by a customer;

a lock housing having a receptacle adapted to receive the rental bicycle locking element therein, said locking assembly including a latch that is partially disposed in said receptacle, the latch being moveable into and out of engagement with said rental bicycle locking element present in said receptacle, said locking assembly including means for sensing the presence of said rental bicycle locking element in a proper position for locking in said receptacle;

and control means for operating said locking assembly between said first and second positions.

41. An automated bicycle rental station for the unattended rental of bicycles, comprising:

a bicycle rack;

at least one rental bicycle insertable into and removable from the bicycle rack;

a locking assembly associated with said bicycle rack for locking the rental bicycle to said bicycle rack, the locking assembly being operable between first and second positions wherein the first position, said locking assembly locks said rental bicycle to said bicycle rack and wherein the second position, said locking assembly unlocks said rental bicycle from said bicycle rack, thereby permitting it to be used by a customer;

an elongated housing that houses said locking assembly and receives a portion of said rental bicycle when said locking assembly is in said first position, the housing having a surface that is angularly disposed with respect to said bicycle rack, said housing including at least one opening disposed on the angled surface, the housing opening including a receptacle for receiving said rental bicycle portion, and said locking assembly including a latch partially moveable in and out of said receptacle to respectively lock said rental bicycle to said rental station and unlock said rental bicycle from said rental station; and, control means for operating said locking assembly between said first and second positions.

42. An automated bicycle rental system comprising: a plurality of automated bicycle rental stations, each of the rental stations having a lockable bicycle rack and a control means associated therewith, each of the bicycle racks including a plurality of bicycle-receiving bays, each of said bicycle racks having a preselected number of rental bicycles operatively associated therewith so that a single rental bicycle is disposed in a single bicycle-receiving bay, each said rental station having a plurality of locking assemblies associated with each said rental station bicycle rack thereof so that a single locking assembly is associated with a single bicycle-receiving bay, each said control means of each said rental station being operatively connected to said locking assemblies of said rental station, said control means controlling operation of said associated rental station locking assemblies between first and second positions wherein said locking assemblies respectively lock and unlock said rental bicycles to said rental station, said system further including a central control center for monitoring bicycle rental that occur at each of said rental stations, said central control center being located remote from any of said rental stations, each of said rental station control means being operatively linked to said control center.

* * * * *